United States Patent [19]

Yang

[11] Patent Number: 4,775,132

[45] Date of Patent: Oct. 4, 1988

[54] DETACHABLE MOTOR/AIR PUMP UNIT FOR A HYDRAULIC JACK ADAPTABLE FOR LIFTING AND PUMPING FUNCTIONS

[76] Inventor: Tai-Her Yang, 5-1 Taipin St., Si-Hu, Town, Dzan-Hwa, Taiwan

[21] Appl. No.: 21,352

[22] Filed: Mar. 3, 1987

Related U.S. Application Data

[63] Continuation-in-part of Ser. No. 817,245, Jan. 8, 1986, Pat. No. 4,678,164, which is a continuation-in-part of Ser. No. 791,503, Oct. 25, 1985, Pat. No. 4,678,162.

[51] Int. Cl.[4] .......... B60P 1/48; B66F 3/24

[52] U.S. Cl. .......... 254/8 B; 254/93 H; 254/1

[58] Field of Search .......... 254/93 R, 93 H, 423, 254/1, 89 H, 418, DIG. 2, 8 B; 91/4 R; 74/15.6, 15.63; 7/100

[56] References Cited

U.S. PATENT DOCUMENTS

| | | | |
|---|---|---|---|
| 1,983,444 | 12/1934 | Dry | 254/423 |
| 2,034,605 | 3/1936 | Carman | 254/93 H |
| 2,458,590 | 1/1949 | Harris et al. | 254/DIG. 2 |
| 4,678,162 | 7/1987 | Yang | 254/93 H |

*Primary Examiner*—Robert C. Watson

*Attorney, Agent, or Firm*—Leonard Bloom

[57] ABSTRACT

A jack is adapted for both lifting and pumping functions driven by a common drive motor. This jack has a detachable motor/air pump unit for use apart from the remainder of the jack. The motor/air pump unit is formed as a single unit which, if desired, is independently supported by a stand which is integral therewith. The unit is operatively, removably received in a saddle of the jack, where it is secured in place by a pivoted strap and buckle arrangement.

24 Claims, 7 Drawing Sheets

DETACHABLE MOTOR/AIR PUMP UNIT FOR A HYDRAULIC JACK ADAPTABLE FOR LIFTING AND PUMPING FUNCTIONS

CROSS REFERENCE TO RELATED APPLICATIONS

The present application is a continuation-in-part co-pending application Ser. No. 817,245, filed Jan. 8, 1986 now U.S. Pat. No. 4,678,164 which is a continuation-in-part of pending application Ser. No. 791,503, filed on Oct. 25, 1985 now U.S. Pat. No. 4,678,162, the disclosures of both of said applications incorporated herein in their entirety.

FIELD OF THE INVENTION

The present invention relates to jacks, particularly jacks adapted for performing the tasks of lifting a vehicle and pumping up a tire, and, in particular, to hydraulic jacks for lifting an object, and which include an air pumping feature, both of said functions being driven by a common motor, wherein the motor and the air pumping feature are formed as a single unit which is detachable and usable, apart from the remainder of the jack.

BACKGROUND OF THE INVENTION

In my co-pending applications, Ser. Nos. 791,503 filed Oct. 25, 1985, and 817,245 filed Jan. 8, 1986, there were disclosed various hydraulic jacks adapted for both the lifting of objects, such as a motor vehicle, and for the pumping of air for, i.e., filling the tire of a motor vehicle with air. In both of these applications, the lifting and the pumping features are driven, either directly or indirectly (for greater control), by a common drive motor.

In both of the aforesaid applications, it was noted that if the air pump and oil pump devices using a common drive motor were separable from the remainder of the jack, the pumps could be used to conveniently meet various requirements of special situations.

Unfortunately, there is nothing in the prior art that presents a hydraulic jack having an air pumping feature which is driven by a common drive motor, wherein the motor and the air pumping feature may be readily and easily disassembled from the remainder of the jack for use apart therefrom.

Thus, it can be seen that there remains a need for a hydraulic jack adapted for both the tasks of lifting an object, such as a motor vehicle, and for pumping up an object, such as a tire, wherein both of said tasks are performed using a common drive motor which, along with the air pumping feature, is readily and easily assemblable, to and disassemblable from, the remainder of the jack for use apart therefrom.

SUMMARY OF THE INVENTION

Accordingly, it is an object of the present invention to alleviate the disadvantages and deficiencies of the prior art by providing a drive motor/air pump unit which is readily assemblable to, and disassemblable from, a hydraulic jack, whose lifting feature is also driven by the drive motor.

It is another object of the present invention to provide such a drive motor/air pump unit which easily fits into and is secured in the body of the hydraulic jack.

It is still another object of the present invention to provide such a unit whose use is not interfered with, or restricted by, the working or storage position of the jack.

It is still yet another object of the present invention to provide such a unit which can be used solely to pump up an object, such as the tire of a motor vehicle.

It is a further object of the present invention to provide a hydraulic jack which, using a common drive motor is adapted for both lifting an object such as a motor vehicle and for pumping up an object such as a tire, wherein the drive motor/air pump is formed as a single unit which is readily and easily disassembled from the remainder of the jack for use apart therefrom.

It is a still further object of the present invention to provide such a hydraulic jack in which pumping tasks can be performed independently of lifting tasks.

It is a still yet further object of the present invention to provide drive motor/air pump units and/or hydraulic jacks which are efficient, economical to fabricate and operate, and which are simple and easy to use.

In accordance with the teachings of the present invention, there is disclosed a drive motor/air pump unit for a hydraulic jack having both lifting and pumping features driven by the drive motor. This unit includes a drive motor. An elongated double ended motor shaft is provided. This shaft has respective end portions including a one end portion and a second end portion projecting from and driven by the motor. An air pump is provided. This air pump includes a piston which is connected to the one end portion of the motor shaft. Finally a unit housing is provided having the drive motor, the air pump and the motor shaft operatively disposed therein.

Preferably, the unit housing is further comprised of a motor housing portion having the drive motor disposed therein. The unit housing further has the elongated motor shaft disposed therein, with the respective end portions projecting therefrom. Also, the unit housing has an air pump housing portion having the piston and the one end portion of the motor shaft operatively disposed therein. In one embodiment, the one end portion carries a gear which rotates concomitantly therewith when driven by the drive motor. Also, the piston is eccentrically connected to the gear. In another embodiment, the piston is operatively connected to the one end portion of the shaft by a reduction gearing. In yet another embodiment, the air pump further includes a gauge, so that the air pressure pumped thereby may be observed. In still another embodiment the motor is an electric motor. Also, an electrical conduit is provided being electrically connected to the motor to provide electric power thereto from an external power source. In still yet another embodiment, a stand integral with the unit housing is provided for supporting the unit when said unit is utilized independently of the hydraulic jack.

In further accordance with the teachings of the present invention, there is disclosed a hydraulic jack adapted for lifting an object and for pumping an object. Said jack is of the type having a housing. A drive motor is provided. This drive motor includes an elongated double-end shaft having respective end portions projecting therefrom. An air pump is provided including a piston driven by a one end portion of the shaft. Reduction gearing is provided. An oil pump is driven by the reduction gearing. A lifting mechanism, including a stand shaft, is driven by the oil pump. A top block is driven by the stand shaft for lifting a base. Drain control means is provided for the air pump and oil pump, respectively. An integral unit housing, includes a motor housing portion. The motor housing portion has the drive motor disposed therein with respective end portions of the motor shaft projecting therefrom. The motor housing portion further includes an air pump housing portion having the air pump, the piston and the one end portion of the shaft operatively disposed therein. A saddle is carried by the jack for removably receiving and supporting the unit housing therein. A reduction gearing housing is provided. This housing includes the reduction gearing having the other end portion of the motor shaft operatively, removably coupled with the reduction gearing. In this manner, when coupled, movement of the said other end portion of the motor shaft drives the reduction gearing. Finally, a pivoted strap is provided. This strap has one end which is pivotably secured to the saddle. This strap further has a second, opposite end which is removably secured to a portion of the saddle remote from the one end of the strap. In this manner, when the motor housing is removably received in the saddle, the strap extends over the motor housing when the second opposite end of said strap is secured to the saddle, thereby removably supporting and securing the unit housing to the saddle.

In a preferred embodiment, a buckle is carried on the second opposite end of the pivoted strap. A hook is secured to the portion of the saddle remote from the one end of the strap. Said hook is adapted to cooperate with the buckle to removably secure the second opposite end of the pivoted strap to the remote portion of the saddle. In a second preferred embodiment, the reduction gearing housing is secured to the housing of the jack. If desired, in this preferred embodiment, the saddle may be supported on the oil pump. In a third embodiment, the motor shaft is operatively coupled with the reduction gearing by a recessed translational shaft. This shaft has one end thereof secured to the reduction gearing. This shaft further has a second opposite end thereof having a recess formed therein. Removably received within said recess is the other end of the motor shaft. Said translational shaft is journaled in bearings and is disposed in the reduction gearing housing. In another preferred embodiment, the saddle has a recessed portion formed therein to removably receive and support the motor housing. If desired, in this embodiment, the recessed portion of the saddle has at least one dimple formed therein. Also, the motor housing has at least one nipple formed thereon to cooperate with, and be received in, a corresponding dimple on the saddle. In this manner, proper alignment of the motor housing in the recessed portion of the saddle is facilitated. In still another preferred embodiment, a stand is integral with the unit housing. This stand may support the drive motor/air pump unit when said unit is utilized independently of the remainder of the jack. In yet another preferred embodiment, the reduction gearing housing is integral with the saddle. And, in still yet another preferred embodiment, a pair of handles are integral with the unit housing for facilitating manual control thereof.

In still further accordance with the teachings of the present invention, there is disclosed a hydraulic jack of the type having an air pumping feature. This jack includes a housing. A common drive motor positioned in the housing. The motor includes an elongated double-ended shaft having respective end portions projecting from the motor. An air pump is provided. This air pump includes a piston which is connected to a one end portion of the motor shaft. Reduction gearing is driven by the other end portion of the motor shaft. An oil pump is provided including a crank driven by the reduction gearing. An oil pressure tank is driven by the oil pump and includes a drive rod. A lifting mechanism is provided including a pivoted arm set driven by the drive rod. A pivoted upper arm is coupled to the arm set and includes a supporting block for lifting a vehicle. Drain control means for the air pump and oil pump, respectively is provided. Reduction gearing housing is provided which includes reduction gearing. This housing further includes a translational element which is operatively associated with the reduction gearing. Said translational element has a recessed portion to removably receive therein the other end of the motor shaft. In this manner, movement of the said other end of the motor shaft drives the reduction gearing. A pivoted strap is provided, having one end being pivotably secured to the saddle portion. This strap further has a second, opposite end which is removably secured to the saddle portion. In this manner, when the drive motor is removably received in the saddle, the strap extends over the drive motor when the second opposite end of said strap is secured to the housing, removably supporting and securing the drive motor therein. Finally, a bracket operatively secures the drive motor and its associated motor shaft to the air pump, wherein the air pump is carried by said bracket.

In still yet further accordance with the teachings of the present invention, there is disclosed a hydraulic jack which includes an air pumping feature. The jack includes a base. A main body is positioned on the base. A common drive motor is positioned in the body transversely thereof. The motor includes an elongated double-ended shaft having respective end portions projecting from the motor. An air pump includes a piston. First reduction gearing is connected between the piston and a one end portion of the motor shaft. Second reduction gearing is driven by the other end portion of the motor shaft. An oil pump is driven by the second reduction gearing. A lifting mechanism includes a stand shaft driven by the oil pump. A top block is driven by the stand shaft for lifting a base. Drain control means for the air pump and oil pump, respectively, are provided. Means is provided for removably, operatively positioning and securing the drive motor in the housing. This means allows the second reduction gearing to be removably secured to the other end portion of the motor shaft. In this fashion, when secured, the second reduction gearing is driven by the motor shaft. A bracket means is provided for operatively securing the drive motor, its associated motor shaft and the first reduction gearing to the air pump. In a preferred embodiment, the means for removably operatively positioning the drive motor in the housing is comprised of a saddle for receiving and supporting the motor therein. A reduction gearing housing is carried by the saddle and, includes the second reduction gearing, such that the other end portion of the motor shaft may be removably, operatively coupled with the second reduction gearing. In this manner, movement of the said other of the end portion of the motor shaft drives the said second reduction gearing. A pivoted strap has one end pivotably secured to the saddle. The strap further has a second, opposite end which is removably secured to a portion of the saddle remote from the one end of the strap. In this fashion, when the motor is removably received in the saddle, the strap extends over the motor when the second opposite end thereof is secured to the saddle, removably supporting and securing the motor therein. Preferably, the saddle and the reduction gearing housing are integral.

DESCRIPTION OF THE PREFERRED EMBODIMENTS

Figure 1:
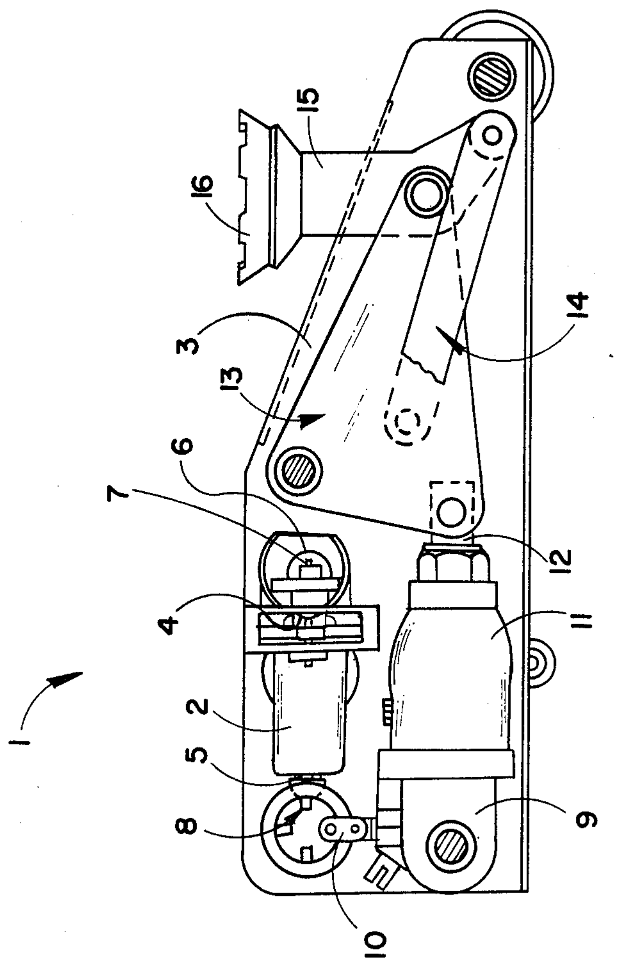
FIG. 1 is a hydraulic jack having lifting and pumping functions, utilizing a common drive motor, in which the drive motor and the air pump may be formed as a single, removable unit according to the present invention.

With reference now to the drawings, in FIG. 1 there is illustrated a hydraulic floor jack 1 adapted for the tasks of lifting a vehicle and pumping up a tire respectively utilizing a common drive motor 2 in which, if desired, the drive motor/air pump unit of the present invention and means for removably, operatively, positioning and securing the drive motor of the present invention may be employed.

This floor jack 1 has a housing 3. A common drive motor 2 is positioned in the housing 3. Drive motor 2 includes an elongated double-ended shaft having respective end portions 4 and 5 projecting from the motor 2.

An air pump 6 is positioned on the housing 3. This pump 6 includes a piston 7. Piston 7 is connected to one of the ends portions 4 of the motor shaft and is thereby driven by said shaft, providing pressurized air (or gas) for pumping up an object, such as the tire of a motor vehicle or a bicycle, sports ball, etc.

Reduction gearing 8 is driven by the other (second) end portion 5 of the motor shaft.

An oil pump 9 is positioned in the housing 3. Oil pump 9 includes a crank 10. Crank 10 is driven by the reduction gearing 8.

An oil pressure tank 11 is positioned in the housing 3. Tank 11 is driven by oil pump 9. Tank 11 includes a drive rod 12. A lifting mechanism 13 is provided. Mechanism 13 includes a pivoted arm set 14 and is driven by the drive rod 12. The pivoted arm set 14 is coupled to a pivoted upper arm 15. Pivoted upper arm 15 includes a supporting block 16 for lifting an object such as a motor vehicle.

Finally, drain control means 17 is provided for the air pump and the oil pump, respectively.

Figure 4:
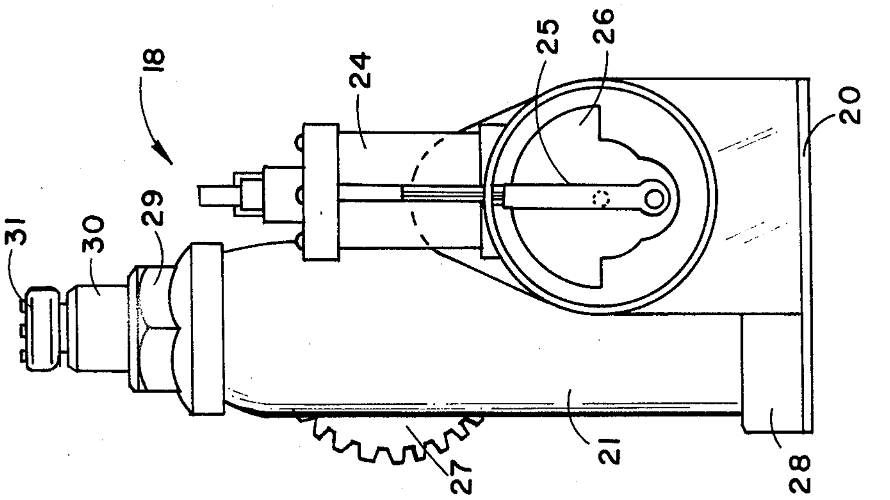
FIG. 4 is another side view of the jack of FIG. 2.
Figure 3:
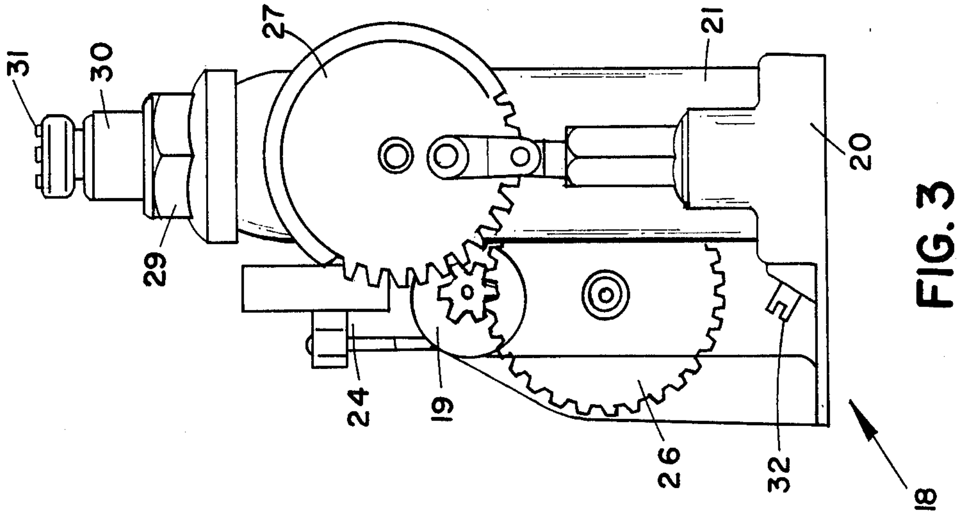
FIG. 3 is a side view of the jack of FIG. 2.
Figure 2:
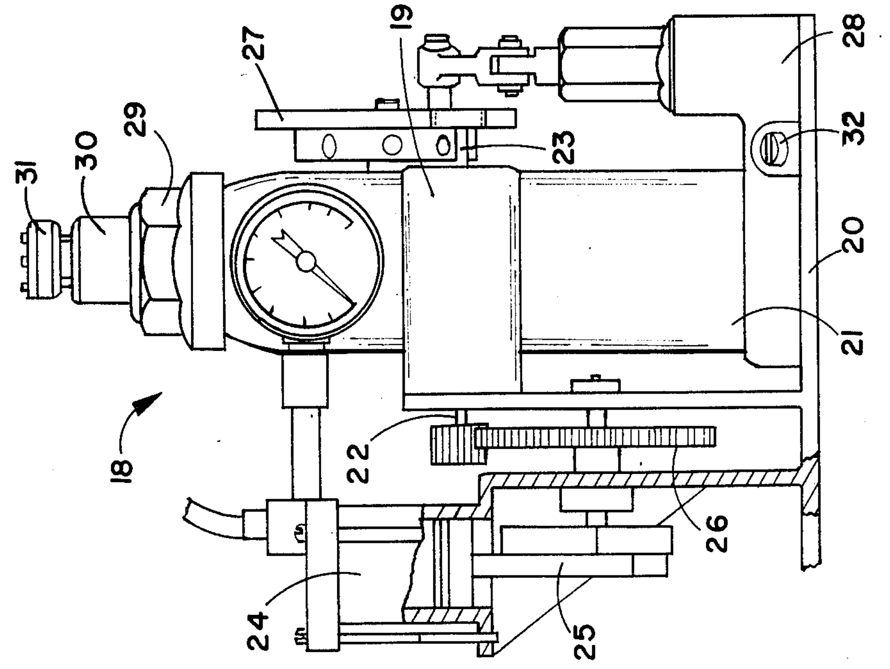
FIG. 2 is a front view of another hydraulic jack having lifting and pumping functions utilizing a common drive motor, in which the drive motor and the air pump may be formed as a single, removable unit according to the present invention.

Referring now to FIGS. 2–4, there is illustrated a hydraulic jack 18 that includes an air pumping feature utilizing a common drive motor 19, which, if desired, may be adapted to utilize the drive motor/air pump unit and the means for removably, operatively, positioning and securing the drive motor of the present invention.

This hydraulic jack 18 has a base 20. A main body 21 is positioned on the base 20. A common drive motor 19 is positioned in the body 21 transversely thereof. The motor 19 includes an elongated double-ended shaft having respective end portions 22 and 23 projecting from the motor 19.

An air pump 24 is positioned in the body 21. This air pump 24 includes a piston 25. Piston 25 is, in turn, connected to the first reduction gearing 26. The first reduction gearing 26 is connected between the piston 25 and one of the end portions 22 of the motor shaft.

Second reduction gearing 27 is driven by the other end portion 23 of the motor shaft. An oil pump 28 is driven by the second reduction gearing 27.

A lifting mechanism 29 is driven by the oil pump 28. This lifting mechanism 29 includes a stand shaft 30. A top block 31 is driven by the stand shaft 30. Finally, drain control means 32 is provided for the air pump and the oil pump, respectively.

Figure 5:
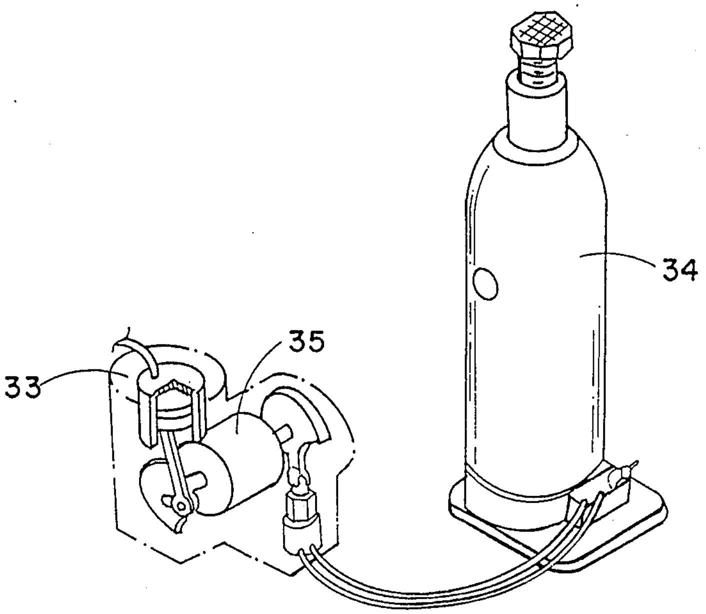
FIG. 5 is one manner in which the lifting and pumping functions, and their associated common drive motor, may be removed from the jack.

Referring now to FIG. 5, the air pump 33 and the oil pump 34 structures of each of the above-said jacks and the principles taught therein, could be applied to most conventional hydraulic jacks. By use of a common drive motor 35, the air pump 33 and the oil pump 34 could, if desired, be separated from the body of the jack. In this fashion, the pumps 33 and 34 may be used to conveniently meet the requirements of particular instances.

Figure 6:
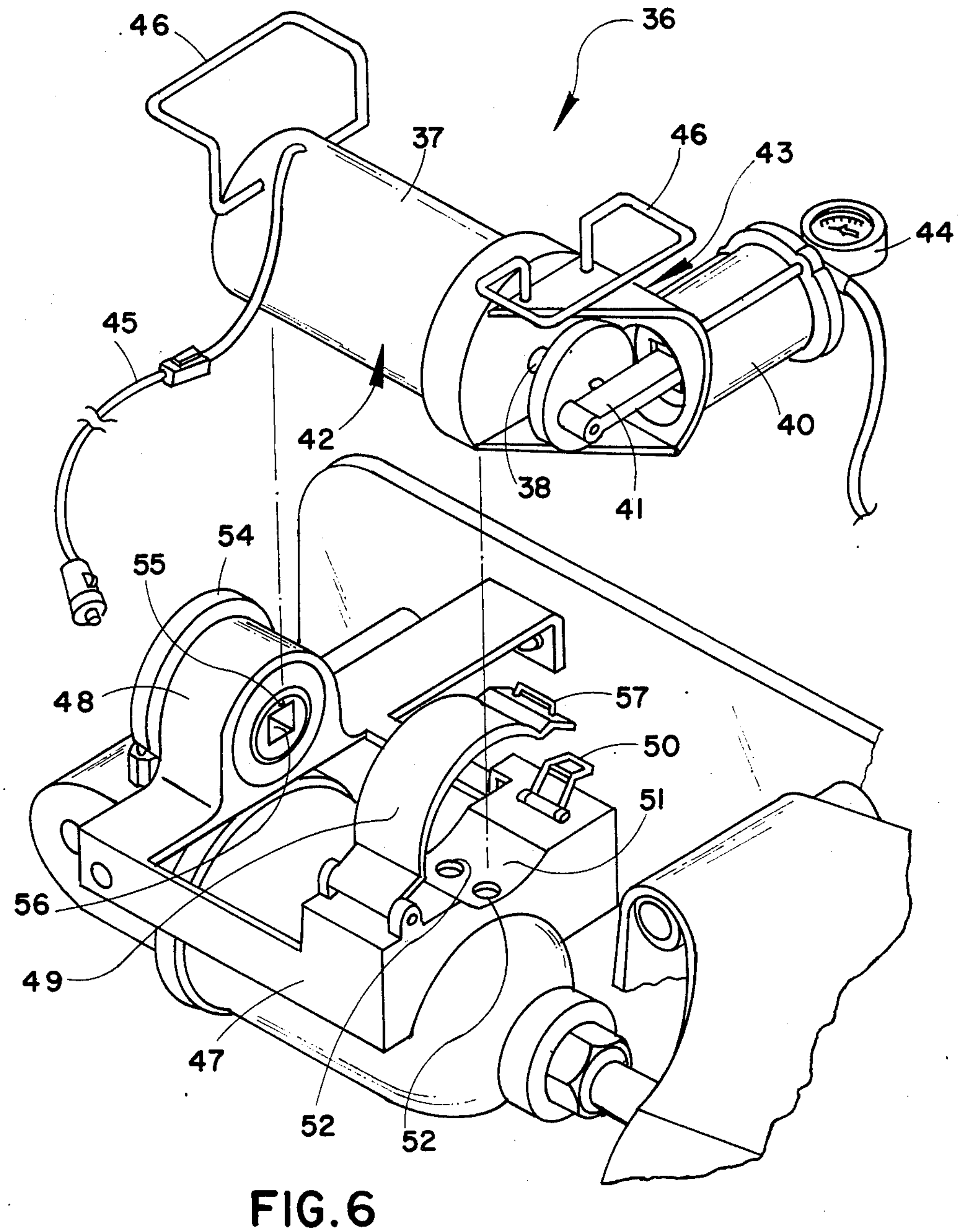
FIG. 6 is a perspective view of the drive motor/air pump unit of the present invention removed, for the sake of clarity, from a means for removably, operatively, positioning and securing the drive motor in the housing of the jack.
Figure 7:
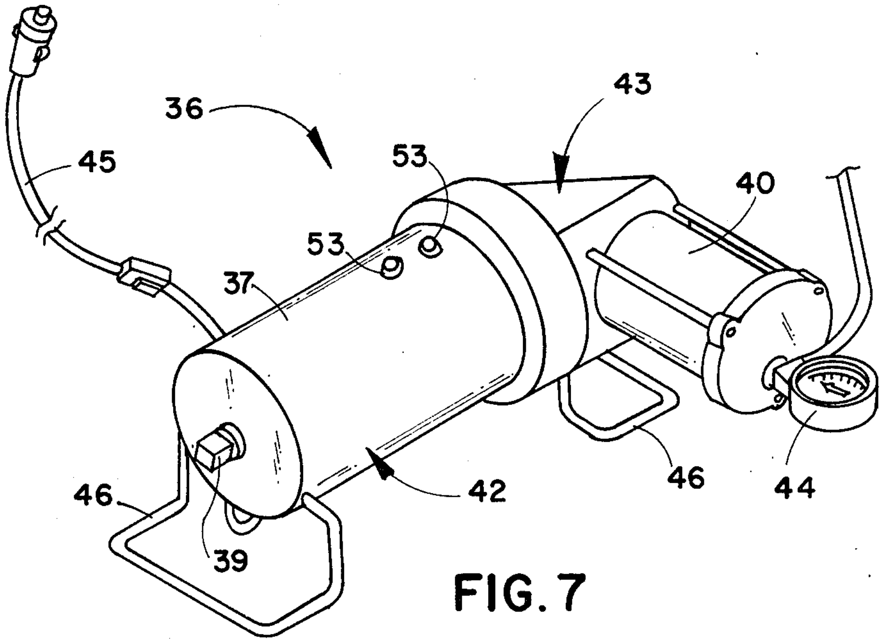
FIG. 7 is another, perspective view of the drive motor/air pump unit of FIG. 6, supported by the stand on a surface.

With reference now to FIGS. 6 and 7, there is illustrated, the drive motor/air pump unit 36 of the present invention. The drive motor/air pump unit 36 has the (common) drive motor 37, including the elongated double-ended motor shaft. The motor shaft has respective end portions 38 and 39 which project from, and are driven by; the motor. The unit 36 also includes an air pump 40. This air pump is carried by, and includes, a piston 41 that is eccentrically connected to a gear which rotates concomitantly with the one of the end portions 38 of the motor shaft. While illustrated thusly, it is to be understood that, if desired, there may also be reduction gearing (first reduction gearing) connected between the one of the end portion 38 of the motor shaft and the piston 41 of the air pump 40.

The unit 36 is housed within a unit housing. This unit housing includes a motor housing portion 42 and an air pump housing portion 43. Motor housing portion 42 has the drive motor disposed therein. The elongated motor shaft is also disposed in the motor housing portion 42 with the respective end portions 38 and 39 projecting therefrom. Air pump housing portion 43 houses not only the air pump 40 and its associated piston 41, but it also houses the one of the end portions 38, as it is operatively connected to the piston 41. If first reduction gearing is provided as aforesaid, said first reduction gearing would also be housed in the air pump housing portion 43.

If desired, the air pump 40 may also be equipped with a gauge, wherein the air pressure being pumped to the object may be observed.

The motor 37 is powered by an external power source which supplies electrical power via an electrical conduit (plug) 45. The motor may in this manner be adapted to operate by either a DC power source of, for example, a common motor vehicle and/or an AC power source of, for example, a common household electrical outlet.

Finally, a pair of downwardly and outwardly extending support structures 46 are provided. These structures 46 are, preferably, integral with the unit housing. These structures 46 may, variously, be utilized as a stand upon which the unit may be supported when removed from the remainder of the jack, and/or as a pair of handles for facilitating manual control of the unit during its placement in, and/or removal from the jack.

With sole reference now to FIG. 6, a means for removably, operatively, positioning and securing the drive motor of the unit within the jack includes a saddle 47, a reduction gearing housing 48 and a cooperating pivoted strap 49 and hook 50. This means collectively allows the reduction gearing and the base to move corresponding to the force resulting from the operation of the hydraulic lifting function. This minimizes problems associated with a poor fit between the other end portion of the motor shaft and the second reduction gearing, which results from the aforementioned force deforming the positioning of those elements.

The saddle 47 is formed and positioned to be received, and at least partly supported, on the main body of the oil pressure tank. The saddle 47 is provided having an upper recessed portion 51 formed therein. Recessed portion 51 is formed having a surface which is complementary to the shape of the surface of the motor housing 42, so as to receive the housing 42 therein when said housing is secured therein. If desired, the recessed portion 51 may further have at least one, and preferably two, dimples 52 formed therein. If these dimples 52 are so provided, then the motor housing 42 should have a corresponding number of nipples 53 formed thereon, so as to cooperate and be received in a corresponding dimple 52. In this fashion, proper alignment of the motor housing 42 in the recessed portion 51 is facilitated. Additionally, when the housing 42 is secured in said recessed portion 51, the cooperation between the dimples 52 and the nipples 53 will lend further structural support to retain the motor housing 42 therein.

Reduction gearing housing 48 is secured to the housing and/or main body of the jack by any suitable means. If desired, said housing 48 may also be integrally formed with the saddle 47. Housing 48 includes reduction gearing 54 (second reduction gearing) which may either be disposed within the gearing housing 48 or may be operatively connected to the gearing housing 48 (as shown). The reduction gearing 54 may be operatively coupled with the other end portion 39 of the motor shaft by a translational shaft (element) 55. Translational shaft 55 is positioned in the reduction gearing housing (shaft bearing base) 48 being journaled in bearings for rotational movement therein. The translational element 55 carries the reduction gearing 54 at one end thereof for concomitant rotational movement therewith. Said translational shaft 55 has a second opposite portion having a recess 56 formed therein. The recess 56 is formed so as to be shaped complementary to the shape of the other end portion 39 of the motor shaft, formed and positioned thusly, the recess 56 may removably receive the other end portion 39 of the motor shaft therein, when the unit 36 is operatively positioned in the saddle 47. In this manner, the rotational movement of the said other of the end portion 39 of the motor shaft drives the translational shaft 55 therewith which, in turn, concomitantly rotates (drives) the reduction gearing (second reduction gearing) 54.

Pivoted strap 49 is pivotably secured at its one end to the saddle 47 on one side of the recessed portion 51 thereof. Strap 49 has a second, opposite end which carries a buckle 57 thereon. On a portion of the saddle 47 remote from the one end of the strap 49, is secured a hook 50. Preferably, said hook 50 is secured on an opposite side of the recessed portion of the saddle 47 from the pivotably connected one end of the strap 49. Said hook 50 is adapted to cooperate with the buckle 57 to removably secure the second opposite end of the pivoted strap 49 to the remote portion of the saddle 47, such that when the unit 36 is operatively positioned in the saddle 47 and the gearing housing 48, the strap 49 extends over the motor housing portion 42 of the unit 36, removably securing the unit (and unit housing) in the saddle 47.

Figure 8:
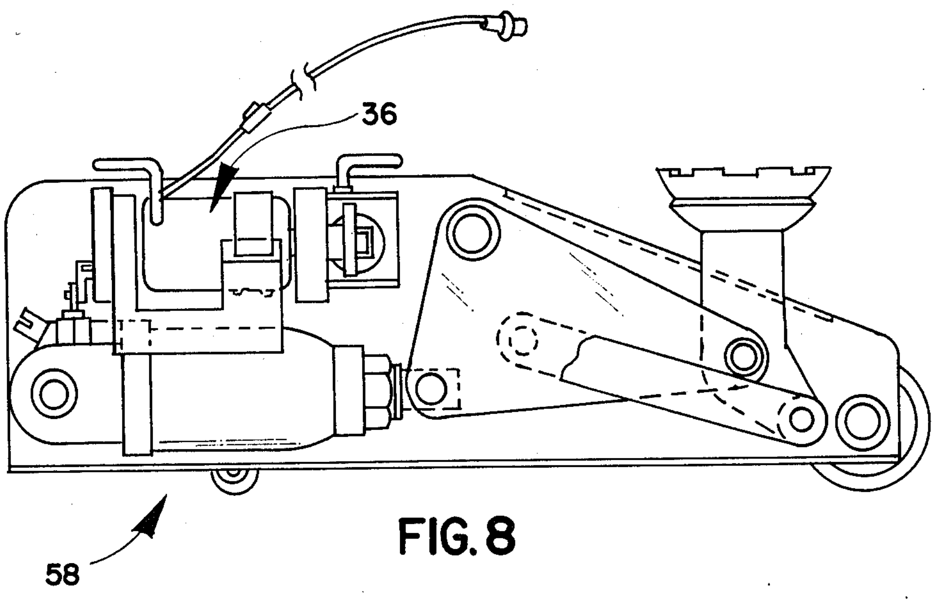
FIG. 8 is a side view of a hydraulic jack having lifting and pumping functions utilizing a common drive motor, the jack being in cross-section, to reveal the positioning therein of the drive motor/air pump unit and one of the means for removably, operatively, positioning and securing the drive motor in the housing of the jack.
Figure 9:
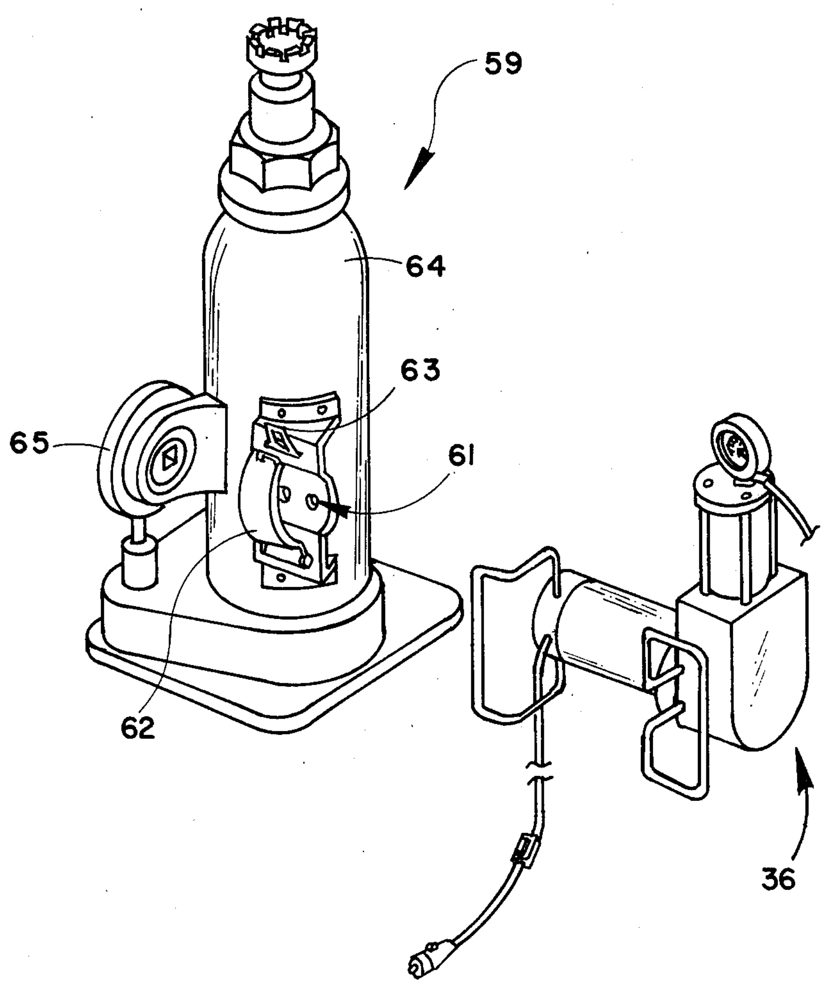
FIG. 9 is a perspective view of another hydraulic jack having the drive motor/air pump unit removed therefrom for the sake of clarity and further illustrating another means for removably, operatively, positioning and securing the drive motor.
Figure 10:
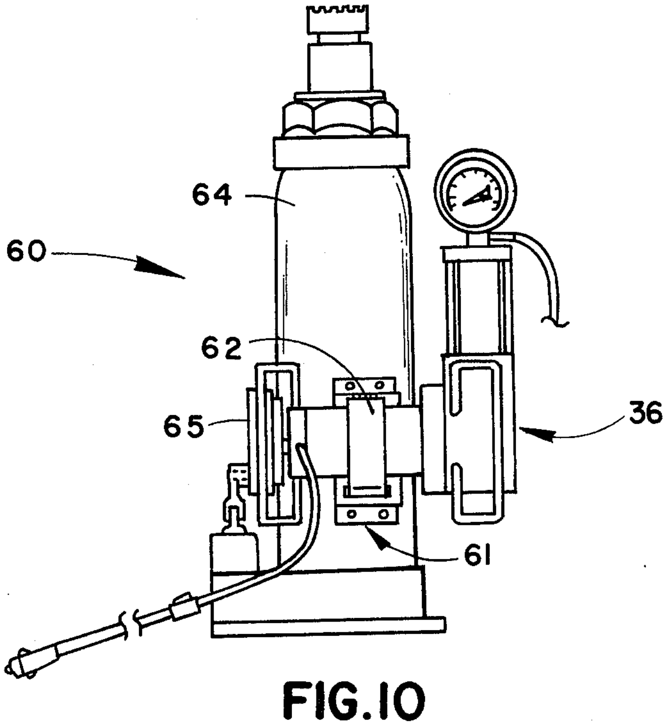
FIG. 10 is a front view, corresponding substantially to FIG. 9, illustrating positioning of the drive motor/air pump unit in another means for removably, operatively, positioning and securing the drive motor.

The unit 36 as described above may alternatively be utilized in cooperation with a hydraulic floor jack 58 adapted for the tasks of lifting a vehicle and pumping up a tire (FIG. 8) and/or it may be adapted for use in hydraulic jack 59 and 60, respectively, including an air pumping feature (FIGS. 9 and 10).

Finally, FIGS. 9 and 10 also illustrate another means for removably, operatively, positioning and securing the drive motor of the unit to the jack. This means includes a saddle 61, having a cooperating, pivoted strap 62 and hook 63 as described above. Saddle 61 is bolted on the main body of the oil pressure tank 64. The reduction gearing housing 65 is formed integral with the main body of the oil pressure tank 64.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A removable drive motor/air pump unit for use either with or apart from a hydraulic jack having both lifting and pumping features driven by the drive motor, said removable drive motor/air pump unit comprising:
   - a drive motor;
   - an elongated double ended motor shaft having respective end portions including a one end portion projecting from and driven by the motor;
   - an air pump, including a piston connected to the one end portion of the motor shaft; and
   - a removable unit housing being removably secured to the hydraulic jack and having the dirve motor, the air pump and the motor shaft operatively disposed therein, the removable unit housing including a motor housing portion having the drive motor disposed therein, and further having the elongated motor shaft disposed therein with the respective end portions projecting therefrom, and an air pump housing portion integral with the motor housing portion, the air pump housing portion having the piston and the one end portion of the motor shaft operatively disposed therein.

2. The drive motor/air pump unit of claim 1, wherein the one end portion carries a gear which rotates concomitantly therewith when driven by the drive motor, and further wherein the piston is eccentrically connected to the gear.

3. The drive motor/air pump unit of claim 1, wherein the piston is operatively connected to the one end portion of the shaft by a reduction gearing.

4. The drive motor/air pump unit of claim 1, wherein the air pump further includes a gauge, so that the air pressure pumped thereby may be observed.

5. The drive motor/air pump unit of claim 1, wherein the motor is an electric motor, and further wherein an electrical conduit is provided being electrically connected to the motor to provide electric power thereto from an external power source.

6. A drive motor/air pump unit for a hydraulic jack having both lifting and pumping features driven by the drive motor, said drive motor/air pump unit comprising:

a drive motor;

an elongated double ended motor shaft having respective end portions including a one end portion projecting from and driven by the motor;

an air pump, including a piston connected to the one end portion of the motor shaft;

a unit housing having the drive motor, the air pump and the motor shaft operatively disposed therein; and a stand integral with the unit housing for supporting the unit when said unit is utilized independently of the hydraulic jack.

7. In a hydraulic jack adapted for lifting an object and for pumping an object, said jack being of the type having a housing, a drive motor including an elongated double-end shaft having respective end portions projecting from the motor, an air pump including a piston driven by a one end portion of the shaft, reduction gearing, an oil pump driven by the reduction gearing, a lifting mechanism including a stand shaft driven by the oil pump, a top block driven by the stand shaft for lifting a base, and drain control means for the air pump and oil pump respectively, the improvement thereon comprising:

an integral unit housing, including a motor housing portion having the drive motor disposed therein with respective end portions of the motor shaft projecting therefrom, and further including an air pump housing portion having the air pump, the piston and the one end portion of the shaft operatively disposed therein;

a saddle carried by the jack for removably receiving and supporting the unit housing therein;

a reduction gearing housing including the reduction gearing having the other end portion of the motor shaft operatively removably coupled with the reduction gearing, so that, when coupled, movement of the said other end portion of the motor shaft drives the reduction gearing; and a pivoted strap having one end pivotably secured to the saddle and further having a second, opposite end removably secured to a portion of the saddle remote from the one end of the strap, such that when the motor housing is removably received in the saddle, the strap extends over the motor housing when the second opposite end of said strap is secured to the saddle, thereby removably supporting and securing the unit housing to the saddle.

8. The improvement of claim 7, further including a buckle carried on the second opposite end of the pivoted strap and a hook secured to the portion of the saddle remote from the one end of the strap, said hook being adapted to cooperate with the buckle to removably secure the second opposite end of the pivoted strap to the remote portion of the saddle.

9. The improvement of claim 7, wherein the reduction gearing housing is secured to the housing of the jack.

10. The improvement of claim 9, further wherein the saddle is supported on the oil pump.

11. The improvement of claim 7, wherein the motor shaft is operatively coupled with the reduction gearing by a recessed translational shaft having one end thereof secured to the reduction gearing and a second opposite end thereof having a recess formed therein to removably receive the other end of the motor shaft, said translational shaft being journaled in bearings and being disposed in the reduction gearing housing.

12. The improvement of claim 7, further including the saddle having a recessed portion formed therein to removably receive and support the motor housing.

13. The improvement of claim 12, further including the recessed portion of the saddle having at least one dimple formed therein and the motor housing having at least one nipple formed thereon to cooperate with, and be received in, a corresponding dimple on the saddle, such that proper alignment of the motor housing in the recessed portion of the saddle is facilitated.

14. The improvement of claim 7, further including a stand integral with the unit housing for supporting the drive motor/air pump unit when said unit is utilized independently of the remainder of the jack.

15. The improvement of claim 7, wherein the reduction gearing housing is substantially aligned with the saddle.

16. The improvement of claim 7, further including a pair of handles integral with the unit housing for facilitating manual control thereof.

17. In a hydraulic jack adapted for lifting an object and for pumping an object, said jack being of the type having a housing, a drive motor including an elongated double-end shaft having respective end portions projecting from the motor, an air pump including a piston driven by a one end portion of the shaft, reduction gearing, an oil pump driven by the reduction gearing, a lifting mechanism including a stand shaft driven by the oil pump, a top block driven by the stand shaft for lifting a base, and drain control means for the air pump and oil pump respectively, the improvement thereon comprising:

an integral unit housing, including a motor housing portion having the drive motor disposed therein with respective end portions of the motor shaft projecting therefrom, and further including an air pump housing portion having the air pump, the piston and the one end portion of the shaft operatively disposed therein;

a saddle supported on the oil pump for removably receiving and supporting the unit housing therein;

a reduction gearing housing substantially aligned with the saddle including the reduction gearing having the other end portion of the motor shaft operatively removably coupled with the said reduction gearing, so that, when coupled, movement of the said other end portion of the motor shaft drives the reduction gearing;

a pivoted strap having one end pivotably secured to the saddle and further having a second, opposite end removably secured to a portion of the saddle remote from the one end of the strap, such that when the motor housing is removably received in the saddle, the strap extends over the motor housing when the second opposite end of said strap is secured to the saddle, thereby removably supporting and securing the unit housing to the saddle;

a buckle carried on the second opposite end of the pivoted strap and a hook secured to the portion of the saddle remote from the one end of the strap, said hook being adapted to cooperate with the buckle to removably secure the second opposite end of the pivoted strap to the remote portion of the saddle;

wherein the motor shaft is operatively coupled with the reduction gearing by a recessed translational shaft having one end thereof secured to the reduction gearing and a second opposite end thereof having a recess formed therein to removably receive in said recess, the other end of the motor shaft, said translational shaft being journaled in bearings and being disposed in the reduction gearing housing;

further including the saddle having a recessed portion formed therein to removably receive and support the motor housing, the recessed portion of the saddle having at least one dimple formed therein and the motor housing having at least one nipple formed thereon to cooperate with, and be received in, a corresponding dimple on the saddle, such that proper alignment of the motor housing in the recessed portion of the saddle is facilitated;

a stand integral with the unit housing for supporting the drive motor/air pump unit when said unit is utilized independently of the remainder of the jack; and a pair of handles integral with the unit housing for facilitating manual control thereof.

18. In a hydraulic jack of the type having an air pumping feature, a housing, a common drive motor in the housing, the motor includnng an elongated double-ended shaft having respective end portions projecting from the motor, an air pump including a piston connected to a one end portion of the motor shaft, reduction gearing driven by the other end portion of the motor shaft, an oil pump including a crank driven by the reduction gearing, an oil pressure tank driven by the oil pump and including a drive rod, a lifting mechanism including a pivoted arm set driven by the drive rod, a pivoted upper arm coupled to the arm set and including a supporting block for lifting a vehicle and drain control means for the air pump and oil pump, respectively, the improvement thereon comprising in combination:

reduction gearing housing including reduction gearing, and further including a translational element operatively associated with the reduction gearing, said translational element having a recessed portion to removeably receive therein the other end of the motor shaft, so that movement of the said other end of the motor shaft drives the reduction gearing;

a pivoted strap having one end being pivotably secured to the saddle portion and further having a second, opposite end being removeably secured to the saddle portion, such that when the drive motor is removably received in the saddle, the strap extends over the drive motor when the second opposite end of said strap is secured to the housing, removeably supporting and securing the drive motor therein; and a bracket for operatively securing the drive motor and its associated motor shaft to the air pump, wherein the air pump is carried by said bracket.

19. In a hydraulic jack including an air pumping feature, the combination of a base, a main body on the base, a common drive motor in the body transversely thereof, the motor including an elongated double-ended shaft having respective end portions projecting from the motor, an air pump and including a piston, first reduction gearing connected between the piston and a one end portion of the motor shaft, second reduction gearing driven by the other end portion of the motor shaft, an oil pump driven by the second reduction gearing, a lifting mechanism including a stand shaft driven by the oil pump, a top block driven by the stand shaft for lifting a base, and drain control means for the air pump and oil pump, respectively, the improvement thereon, comprising, in combination;

means for removeably, operatively positioning and securing the drive motor in the housing, wherein the second reduction gearing may be removably secured to the other end portion of the motor shaft, whereby when secured, the second reduction gearing is driven by the motor shaft; and a bracket means for operatively securing the drive motor, its associated motor shaft and the first reduction gearing to the air pump.

20. The improvement of claim 19, wherein the means for removably operatively positioning the drive motor in the housing is comprised of:

a saddle for receiving and supporting the motor therein;

reduction gearing housing carried by the saddle, including the second reduction gearing, such that the other end portion of the motor shaft may be removably operatively coupled with the second reduction gearing, so that movement of the said other of the end portion of the motor shaft drives the said second reduction gearing;

a pivoted strap having one end pivotably secured to the saddle and further having a second, opposite end removeably secured to a portion of the saddle remote from the one end of the strap, such that when the motor is removably received in the saddle, the strap extends over the motor when the second opposite end thereof is secured to the saddle, removeably supporting and securing the motor therein.

21. The improvement of claim 20, wherein the saddle and the reduction gearing housing are substantially aligned.

22. In a hydraulic floor jack adapted for the tasks of lifting a vehicle and pumping up a tire, respectively, the combination of a housing, a common drive motor in the housing, the motor including an elongated double-ended shaft having respective end portions projecting from the motor, an air pump on the housing and including a piston connected to a one end portion of the motor shaft, reduction gearing driven by the other end portion of the motor shaft, an oil pump including a crank driven by the reduction gearing, an oil pressure tank driven by the oil pump and including a drive rod, a lifting mechanism including a pivoted arm set driven by the drive rod, a pivoted upper arm coupled to the arm set and including a supporting block for lifting a vehicle, and drain control means for the air pump and oil pump, respectively, the improvement thereon comprising, in combination:

means for removably, operatively positioning and securing the drive motor in the housing, wherein the reduction gearing may be removeably secured to the other end portion of the motor shaft, whereby when secured, the reduction gearing is driven by the motor shaft; and a bracket means for operatively securing the drive motor, and its associated motor shaft to the air pump.

23. The improvement of claim 22, wherein the means for removably, operatively positioning the drive motor in the housing is comprised of:

a saddle for receiving and supporting the motor therein;

reduction gearing housing carried by the saddle, including the reduction gearing, such that the other end portion of the motor shaft may be removably operatively coupled with the reduction gearing, so that movement of the said other of the end portion of the motor shaft drives the said reduction gearing;

a pivoted strap having one end pivotably secured to the saddle and further having a second, opposite end removeably secured to a portion of the saddle remote from the one end of the strap, such that when the motor is removably received in the saddle, the strap extends over the motor when the second opposite end thereof is secured to the saddle removeably supporting and securing the motor therein.

24. The improvement of claim 23, wherein the saddle and the reduction gearing housing are substantially aligned.

* * * * *